(12) United States Patent
Kreten et al.

(10) Patent No.: US 6,816,484 B1
(45) Date of Patent: Nov. 9, 2004

(54) CIRCUIT AND METHOD FOR SWITCHING THROUGH CHANNELS OF A MULTI-CHANNEL CONNECTION

(75) Inventors: Axel Kreten, Puchheim (DE); Dieter Gneiting, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/787,996
(22) PCT Filed: Sep. 23, 1999
(86) PCT No.: PCT/DE99/03059

§ 371 (c)(1),
(2), (4) Date: Mar. 22, 2001

(87) PCT Pub. No.: WO00/19766

PCT Pub. Date: Apr. 6, 2000

(30) Foreign Application Priority Data

Sep. 29, 1998 (DE) .......................... 198 44 732

(51) Int. Cl.⁷ .............................. H04L 12/50
(52) U.S. Cl. ...................... 370/360; 370/388
(58) Field of Search ................ 370/431, 438, 370/439, 443, 450, 462, 464, 524, 360, 388

(56) References Cited

U.S. PATENT DOCUMENTS 3,742,148 A * 6/1973 Ledeen et al. ............... 370/439
4,512,014 A     4/1985 Binz et al.

FOREIGN PATENT DOCUMENTS

| DE | 1 917 891 | 10/1970 |
| DE | 33 33 775 | 4/1985 |
| EP | 0 594 356 | 4/1994 |

OTHER PUBLICATIONS

Gupta, Sudhir et al, "A Comparison of Two Approaches for Switched Wideband Connections", 1996 Annual Review of Communications, pp. 549–552.

Gupta et al. "A Comparison of Two Approaches for Switched Wideband Connections" 1996 Annual Review of Communication, pp. 549–552.

* cited by examiner

Primary Examiner—Wellington Chin
Assistant Examiner—Brenda Pham
(74) Attorney, Agent, or Firm—Morrison & Foerster LLP

(57) ABSTRACT

In a connection comprising N channels for transmitting a high data rate, a first channel is provided in a control unit which takes over coordination of the further N–1 channels. The individual channels of the connection comprising N channels furthermore appear in the exchange according to the use of their resources; however, only the first channel is responsible for controlling the connection, so that only one single N-fold connection is set up through the switching system.

7 Claims, 2 Drawing Sheets

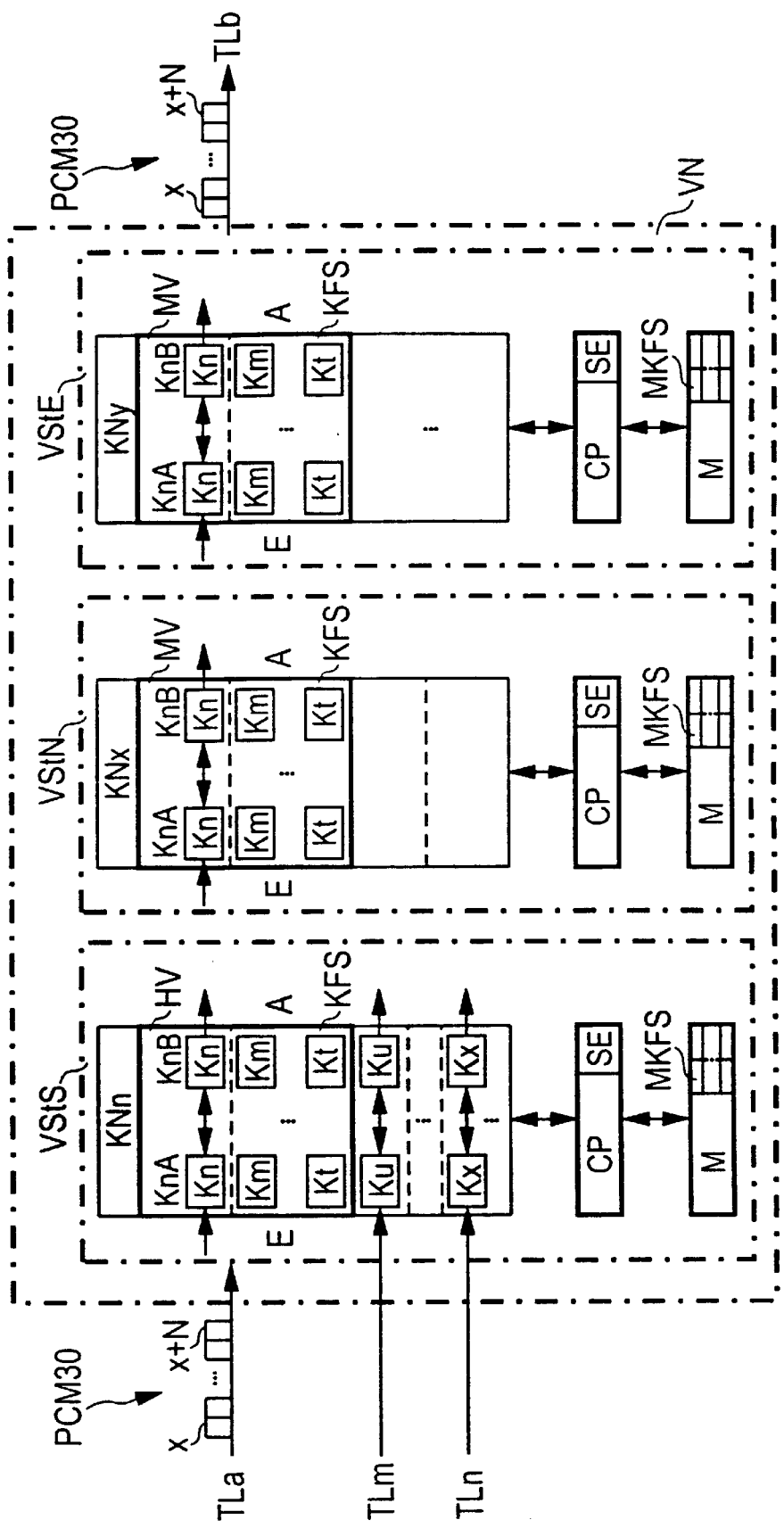

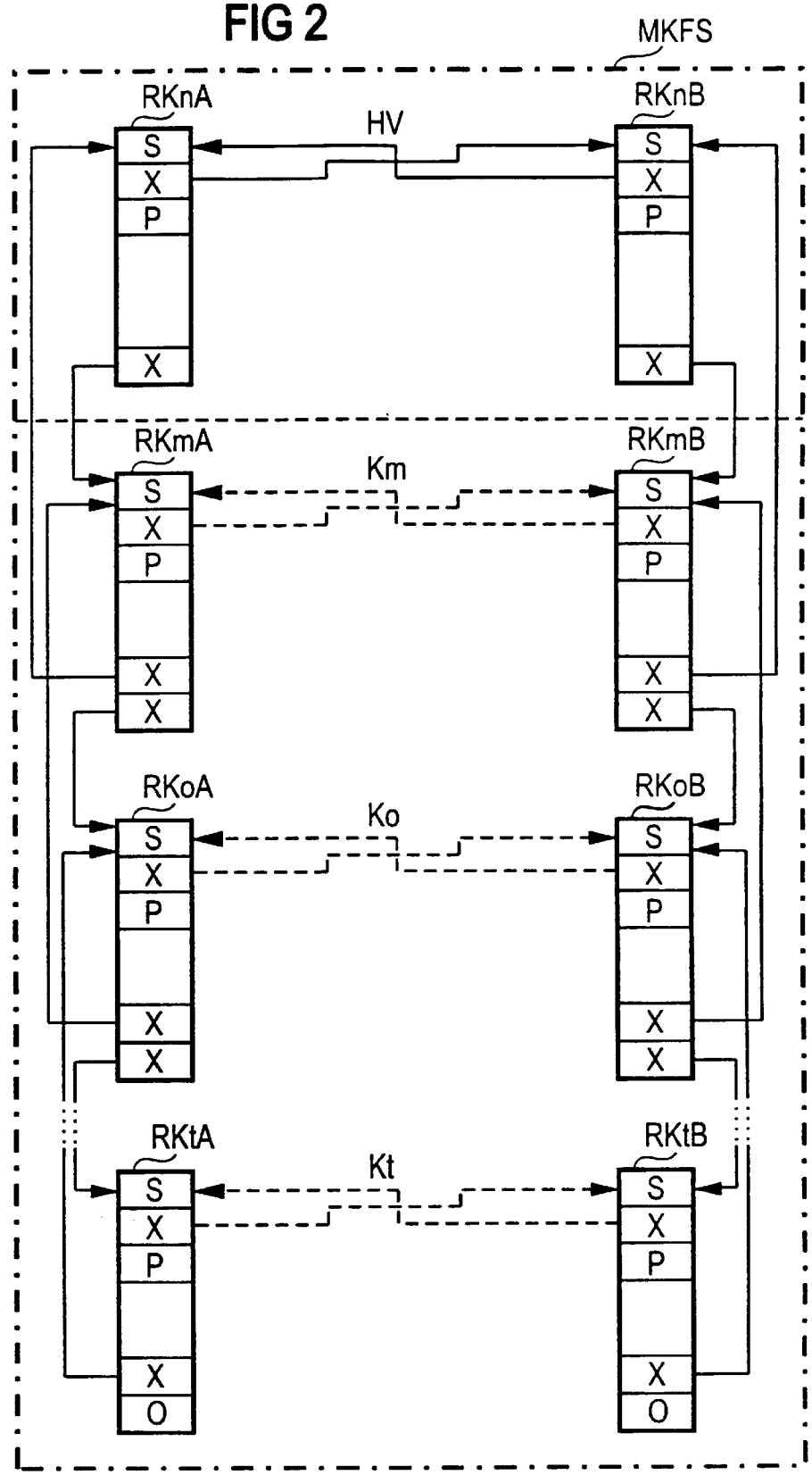

CIRCUIT AND METHOD FOR SWITCHING THROUGH CHANNELS OF A MULTI-CHANNEL CONNECTION

Conventional data transmission in line-switched narrowband telecommunications networks is based on analog and digitized data transmission at a data transmission rate of 64 kbit/s or fractions thereof. At this data transmission rate, voice, data such as texts or images can be transmitted in a telecommunications network whose digital design and signaling are known by the term Integrated Services Digital Network ISDN.

With the dawn of the multimedia age, the demand for data volumes to be transmitted has risen sharply, with the result that the aforementioned data transmission rate is no longer adequate for these applications. Applications such as access to online services, e.g. the Intranet or Internet, videoconferencing, distance learning, telemedicine, high-bit-rate data transmission, etc., require data transmission rates amounting to a multiple of the data transmission rate of an ordinary telephone call. The aforementioned applications may be allocated to one of the following three classes: narrowband up to 64 kbit/s, wideband over 64 kbit/s to 2 Mbit/s, and broadband over 2 Mbit/s.

Whereas broadband networks, with their high data transmission rates, require an overlay network separated from the narrowband network and designed, for example, on the basis of Asynchronous Transfer Mode ATM technology, this is uneconomical for wideband connections. For these data transmission rates, a method is therefore used which is known by the term channel bundling. In channel bundling, data at the transmitting end are split up into data streams with a granularity of 64 kbit/s and are switched through the network via individual channels. According to the definition of wideband connections, between 2 and 30 channels are required for this purpose. At the receiving end, the data from these N channels must in turn be recombined as they were transmitted from the transmitting end. To do this, the temporal and logical association of the data on the N channels must be known to the receiving end.

In a network with digitally transmitted data, each connection comprises consecutive segments which are formed by exchanges and transmission segments. Switching through an exchange can be effected here by entering dialing information, or administratively using a dedicated connection. Data can be transmitted via a multiplicity of connection paths of different designs.

A distinctive feature of a line-based dial-up connection network is that each connection is switched through the dial-up connection network independently of all other connections. Optimum utilization of existing network resources determines the path of the individual connection through the network. The initiator of such a connection has little influence on this path. The network operator influences the routing of the data traffic streams by setting up control mechanisms.

In addition to the distribution of data traffic streams in a transmission network, the routing of data traffic streams within an exchange must be taken into consideration. In general, an individual exchange in turn comprises a combination of switching devices which are meshed with one another by means of corresponding data transmission channels.

On the whole, each line-switched connection can thus be represented within a switching network as a combination of at least two terminal devices, k switching units and k+1 data transmission paths.

A terminal-device-based solution variant and a network-based solution variant are available for identifying the association of transmitted data in wideband connections and for restoring the data in their transmission sequence. The network-based solution is examined more closely below.

Corresponding to a data transmission rate which is to be made available, N channels are set up as a single N-fold connection through the switching network. Within the switching network, the switching system ensures that the required N single channels are always routed together in one PCM system throughout the entire network, i.e. their temporal association is retained. When the N single channels are switched through within an exchange, it must furthermore be ensured that the logical sequence or logical association of the N single channels is not modified. The individual conditions to be observed for this purpose are summarized in guidelines for compliance with the sequence of the PCM time slots (Time Slot Sequence Integrity DSSI). As a result, along with special requirements for the switching networks of the exchanges, the N single channels of an Nx64 kbit/s connection between the exchanges and from/to the terminal devices must always be located in the same PCM system.

In order to comply with the above-mentioned conditions, the single channels of the N-fold connection must in each case be coordinated in the switching units and the switching procedures must be carried out for each channel. This has the disadvantage that the processors of the switching units are burdened with a multiplicity of coordination and N-fold switching procedures, during which they cannot be used for other switching tasks.

A through-connection of broadband channels comprising a plurality of single channels for time division multiplex systems with delta modulation is known from U.S. patent specification 4,512,014. Hold or voice storage addresses in each case of one single channel only are transferred by the central controller to a hold latch, while the addresses of the remaining sub-channels of the broadband signal are generated locally and independently under the influence of a corresponding identifier with the aid of the time-slot counter for cyclical activation of the hold latch.

The object of the invention is to indicate a circuit arrangement and a method for joint switching through of at least two single channels in one switching unit, avoiding the above-mentioned disadvantages.

The object is achieved by means of the features of claims 1 and 7.

The invention offers the advantage that no coordination of N single channels is required in a switching device.

The invention offers the advantage that all switching activities such as digit evaluation and processing, routing, network features, barring evaluation and charging are required for one channel only, i.e. once for each switching-through of the entire connection.

The invention offers the advantage that adherence to the sequence of PCM time slots during switching through the switching devices of the switching system can be effected without major outlay, since all N paths can in each case be handled with one N-fold setting command.

The invention offers the advantage that faults need only be cleared from one main connection.

Further special features are indicated in the subclaims.

The circuit arrangement and method will become clear from the following detailed explanations of an embodiment with reference to drawings in which:

FIG. 1 shows a switching network, and

FIG. 2 shows a memory assignment in an exchange with the resources of N single channels.

FIG. 1 shows a possible implementation in which N single channels are routed together through switching devices KNn, KNx, . . . , KNy of exchanges VStS, VStN, . . . , VStE of a switching network VN. For the channels x to x+N of a PCM 30/PCM 24 system seized by a terminal device of a subscriber Tla, a corresponding number of N single channels must be seized in the switching devices KNn, KNm, . . . , KNx of the exchanges VStS, VStN, . . . , VStE.

In order to maintain the temporal sequence of the N-PCM time slots determined by the terminal device of the subscriber Tla in a seizure of a plurality of channels, the connection set-up for the associated N single channels Kn, Km, . . . , Kt is taken over by a first channel HV. This first channel HV, also referred to below as the main connection, takes over the coordination of the further N−1 single channels. The data of a connection set-up of one channel between an input E and an output A of the switching device KNn, KNx, . . . , KNy are temporarily stored in a memory area MKFS of a memory unit M of the respective switching device KNn, KNm, . . . , KNx. The control of the first channel HV and the coordination of the further N−1 single channels by the first channel HV are taken over by a control unit SE of a processor CP. The data of the switching activities such as digit evaluation and processing, routing, network features, barring evaluation and charging, etc. are stored only in the resources of the first channel HV. The resources of the individual channels are stored in a memory area MKFS of a memory M. The resources of the passive N−1 single channels coordinated by the first channel HV hold only the data of the respective paths seized in the exchange.

The coordination and control of the essentially equally-authorized N single channels during the connection set-up through all the devices of the exchange VStS, VStN, . . . , VStE is taken over in each case by the first channel HV in the switching devices KNn, KNx, . . . , KNy of the exchanges VStS, VStN, . . . , VStE. The further channels Km, . . . , Kt of the N single channels which are to be controlled or coordinated are marked as associated and treated in such a way that the sequence of the individual time slots x to x+N of the PCM 30 time slots seized by the terminal device of the subscriber Tla is retained in all switching and through-connection devices, as occurred at the beginning or on entry of the connection into the switching network VN.

In the switching devices KNn, KNx, . . . , KNy, channels HV, Kn, . . . , Kt, for example of the N single channels to be bundled, are shown within one section KFS of the switching and through-connection devices. According to the invention, control of the further channels Kn, Kt of the N channels HV, Kn, . . . , Kt which are to be bundled for data transmission is allocated to the first channel HV. Under the control of the first channel HV, all N−1 passive single connections are also controlled by said first channel. The N single channels HV, Kn, . . . , Kt furthermore appear in the exchange VStS, VStN, . . . , VstE in terms of the use of their resources RKnA, RKmA, . . . , RKnB, RKmB. However, only the first channel HV is responsible for controlling the N single channels in the exchange VStS, VStN, . . . , VSty and for the signaling in the respective network. The first channel HV performs only one switching operation, but also uses the resources RKmA, RKoA, . . . , RKmB, RKOB of the N−1 passive single connections of the channels Km, . . . , Kt in parallel with its own resources RKnA, RKnB.

Devices of the first channel HV ensure that, for each individual switching operation in the switching device KNn, KNx, . . . , KNy within the exchange VStS, VStN, VStE, the physical/logical and temporal sequence of the time slots of the N single channels presented at the input end E of the switching device KNn, KNx, . . . , KNy is transparently transmitted to the outgoing end A of the connection, so that the sequence of the time slots seized at the beginning of the connection is also maintained within a PCM system over all switching operations in the exchanges VStS, . . . , VStE.

To do this, it is necessary for a channel Nm, Nt, which is associated with these N single connections, to be defined at the input end E of the switching unit KNn, . . . , KNy as a first channel HV for the main connection. The time slot of the physical subscriber connection with the lowest number is preferably defined as the main connection HV. In the switching devices KNn, KNx and KNy, the characteristic of the main connection HV is in each case transmitted to the output end A of the switching devices KNn, KNx and Kny. A number is implicitly logically allocated to the N−1 passive single connections Km, . . . , Kt for the sequence of the physical connections, without being explicitly characterized with a number. With each switching-through of the channels Kn, . . . , Kt of a single switching device KNn, KNx, . . . , KNy, this sequence must be maintained, i.e. the i-th passive channel Km, . . . , Kt at the input end E must be connected to the i-th physical channel at the output end of a switching network KNn. Maintenance of the sequence is thus implicitly achieved without the need to allocate a sequence number explicitly to the relevant passive channel Km, . . . , Kt. This procedure ensures that the i-th passive channel Km, . . . , Kt always retains the characteristic of the i-th passive channel Km, . . . , Kt. If this is carried out for all single switching devices KNn, a KNx, . . . , KNy in the connection path between two terminal devices, the sequence of the time slots on the individual switching device KNx is temporally and logically retained. This characteristic is in each case transmitted for all switching devices KNn, KNx, . . . , KNy and therefore applies to the entire connection. This guarantees that the information occurs at the receiving end A in exactly the same logical and temporal sequence as that in which it was transmitted. At the interface A with the receiving subscriber Tlb, the characteristic allocated to the first channel HV can then be removed, and the N single connections or single channels can be forwarded with equal authorization to the subscriber Tlb.

FIG. 2 shows a section from a memory area MKFS in which the resources RKnA, RKnB, . . . , RKtA, RKtB of the single channels Kn, Km, . . . , Kt of the N-fold connection are presented. One channel Kn, Km, . . . , Kt in each case has resources RKnA, RKnB which are allocated at the input end and the output end to the switching device KNn, KNx, KNy. The status S and the path P are in each case stored in the resources RKnA, RKnB, . . . , RKtA, RKtB, wherein the connection within the switching unit KNn, KNx, . . . , KNy is stored as seized. In addition, all switching activity data relating to the channel hv; Km; . . . , Kt are stored in the resources. In order to guarantee high security in the event of a fault, the addresses of the resources are reciprocally exchanged, so that the logical association of the N channels is temporarily determined for the respective N-fold connection. The connection set-up status is maintained in the resources of the first channel HV only. The remaining resources of the N-fold connection are given only the "passive" status indication.

What is claimed is:

1. A method for switching through N channels that comprise a first channel and further channels of an N-fold connection in a communications network, comprising the step of:

transferring control of said further channels to said first channel, a physical and temporal sequence of said first and said further channels being retained when said first and said further channels are switched through said communications network.

2. The method as claimed in claim 1, further comprising the step of retaining a definition of said first and said further channels during a connection between at least two terminal devices.

3. The method as claimed in claim 1, wherein resources of said first and said further channels remain with said channels.

4. The method as claimed in claim 1, further comprising the step of implicitly logically allocating a number, in each case, to said further channels by their physical connection sequence.

5. The method as claimed in claim 1, further comprising the step of switching said further channels via an N-fold setting command through a switching unit.

6. The method as claimed in claim 1, wherein control and coordination tasks allocated to said first channel remain allocated to said first channel for a connection from one switching unit to the next, and an occupation sequence of outputs of said switching unit with said further channels corresponds to an occupation of inputs of said switching units.

7. A circuit arrangement for switching through N channels that comprise a first channel and further channels of an N-fold connection in a communications network, comprising:
    a control unit which defines a first channel to control said further channels, a switching-through of said first and said further channels being effected such that a physical and temporal sequence of said first and said further channels is retained when said first and said further channels are switched through said communications network.

* * * * *